(12) United States Patent
Hu et al.

(10) Patent No.: US 7,899,787 B2
(45) Date of Patent: Mar. 1, 2011

(54) OBJECT-ORIENTED SYSTEM AND METHOD USING SHADOWING OBJECT FOR APPROVAL CONTROL

(75) Inventors: Xiao Wei Hu, Beijing (CN); Qing Jiu Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1705 days.

(21) Appl. No.: 10/457,170

(22) Filed: Jun. 9, 2003

(65) Prior Publication Data

US 2004/0002881 A1 Jan. 1, 2004

(30) Foreign Application Priority Data

Jun. 28, 2002 (CN) .................................. 02 1 25131

(51) Int. Cl.
*G06F 7/00* (2006.01)
*G06F 17/00* (2006.01)
*G06F 15/173* (2006.01)
*G06F 15/16* (2006.01)
*G06Q 40/00* (2006.01)

(52) U.S. Cl. ............. 707/639; 705/7; 709/223; 709/224; 709/229

(58) Field of Classification Search .......... 707/1, 103 R, 707/609, 639, 759, 770, 802, 821; 705/1, 705/7, 1.1, 28; 717/100; 709/223, 224, 229
See application file for complete search history.

(56) References Cited

U.S. PATENT DOCUMENTS

| | | | |
|---|---|---|---|
| 5,367,573 A | 11/1994 | Quimby .......................... 380/25 |
| 5,692,195 A * | 11/1997 | Conner et al. ................ 719/316 |
| 5,761,511 A * | 6/1998 | Gibbons et al. ............... 717/122 |
| 5,832,483 A | 11/1998 | Barker ............................... 707/8 |
| 5,911,143 A * | 6/1999 | Deinhart et al. .......... 707/103 R |
| 6,058,426 A | 5/2000 | Godwin et al. ................ 709/229 |
| 6,085,191 A * | 7/2000 | Fisher et al. ....................... 707/9 |
| 6,199,195 B1 * | 3/2001 | Goodwin et al. .............. 717/104 |
| 6,269,344 B1 * | 7/2001 | Junger ............................ 705/28 |
| 6,285,363 B1 | 9/2001 | Mairs et al. .................... 345/331 |
| 6,571,232 B1 * | 5/2003 | Goldberg et al. ................. 707/2 |

(Continued)

FOREIGN PATENT DOCUMENTS

WO 0146854 6/2001

OTHER PUBLICATIONS

Marc cibrad, Tim French, and Carsten Maple; "Object Shadowing—a Key Concept for a Modern Programming Language"; University of Luton, LU 3JU, UK; date unknown; pp. 1-5.*

(Continued)

*Primary Examiner* — Ella Colbert
(74) *Attorney, Agent, or Firm* — A. Bruce Clay

(57) ABSTRACT

The present invention describes a technique for using shadowing object for approval control in an object-oriented software environment. The technique calls a business operation and determines whether the business operation needs to be approved. If the business operation needs to be approved, a shadowing business object and a shadowing connector corresponding to the original business object and the connector are created, and the business operation is performed on the shadowing business object and connector, and all results are stored in the shadowing business object, and all messages to be sent are buffered in the connector. If the business operation is approved, the original business object is replaced by the shadowing business object. The technique is flexible, efficient, easy to be modified and supplemented.

6 Claims, 3 Drawing Sheets

U.S. PATENT DOCUMENTS

| | | | | |
|---|---|---|---|---|
| 6,640,249 | B1* | 10/2003 | Bowman-Amuah | 709/228 |
| 6,647,420 | B2* | 11/2003 | Hellbusch et al. | 709/226 |
| 6,789,252 | B1* | 9/2004 | Burke et al. | 717/100 |
| 7,076,474 | B2* | 7/2006 | Jin et al. | 706/45 |
| 7,200,563 | B1* | 4/2007 | Hammitt et al. | 705/7 |
| 7,802,264 | B2* | 9/2010 | Robertson et al. | 709/203 |
| 2003/0055808 | A1* | 3/2003 | Bhat | 707/1 |
| 2003/0212987 | A1* | 11/2003 | Demuth et al. | 717/130 |
| 2007/0203799 | A1* | 8/2007 | Caballero et al. | 705/26 |

OTHER PUBLICATIONS

Shytsun F. Wu and Gail Kaiser; "On Hard Real-Time Management Information"; IEEE; 1994; pp. 90-99.*

Mohsen Sharifi, S.F. Noorani, and F. Orooji; "A New Technique for Participation of Non-Corba Independent Persistent Objects in OTS Transactions"; SpringerLink; Jan. 1, 2002; pp. 281-288.*

Rushikesh K. Joshi, O. Ramakrishna, and D. Janaki Ram (Joshi et al.); "Shadow Objects, Aprogramming Model for Service Replication in Distributed Object Systems"; Department of Computer Science and Engineering, Indian Institute of Technology; Mar. 20, 1996, revised Nov. 4, 1997; pp. 1-12.*

Lun Xiao; "An Object-Oriented Extensible Transaction Management System"; University of Illinois at Urbana-Champaign; 1995; pp. 1-110.*

S. J. Caughe4y, G. D. Parrington and S. K. Shrivastava;"Shadows—A Flexible Support System for Objects in Distributed Systems"; IEEE; 1993; pp. 73-81.*

K. H. (Kane) Kim and Chittur Subbaraman; "An Integration of the Primary-Shadow TMO Replication Scheme with a Supervisor-based Network Surveillance Scheme and its Recovery Time Bound Analysis"; Date Unknown; IEEE; pp. 1-9.*

Mark G. Gray, Randy M. Roberts, and Tom M. Evans; "Shadow-Object Interface Between Fortran 95 and C++"; Scientific Programming; Mar.-Apr. 1999; pp. 63-70.*

Petreley, Nicholas; Computerworld; 36, 23, 47(I); "Unsung alternatives. (Technology). (Column)"; Jun. 3, 2002; pp. 1-2.*

Business Wire; "NeXT Joins Object Definition Alliance to Cteate Object Standards."; Aug. 1, 1995; pp. 1-2.*

Deborah Kurata; "Object-Oriented Programming in Visual Basic. NET"; InStep Technologies, Inc.; Sep. 2001; pp. 1-9.*

* cited by examiner

OBJECT-ORIENTED SYSTEM AND METHOD USING SHADOWING OBJECT FOR APPROVAL CONTROL

BACKGROUND OF THE INVENTION

1. Field of the Invention

The present invention relates to an information system for an e-commerce application. More particularly, the invention relates to an object-oriented system and method which uses a shadowing object for approval control.

2. Description of the Related Art

Information systems are becoming vital parts in our daily life, and it is very important to use the information system to control who can perform what operation on what information at what time. Business-to-business (B2B) transactions usually involve large amount of goods and money transfer. However, approval for these transactions is often performed in manual manner. Therefore, it is necessary to enable the transactions (place order, make contract, create RFQ, choose bid winner, do financial transactions among banks, etc.) to be approved by designated approvers using an information system for e-commerce depending on some predetermined rules.

In the field of access control, a number of patents already exist, such as U.S. Pat. No. 5,911,143 and U.S. Pat. No. 6,085,191. Each of the systems has some kind of access control mechanism, but all of them exercise the control before allowing the user to do the operations. These controls are based on the role of the user and the name of the operations. Once allowed, the user is free to do the operations.

Another aspect of the control is based on the result of the operation. That is, a decision to approve or reject is based on the content of the result. This is usually called approval control. Because of the complexity and diversity of the criteria to judge the results, most information systems add special approval codes to the business operation codes for approval control. A number of patents also address how to check and approve results, such as U.S. Pat. No. 5,963,641, and U.S. Pat. No. 6,269,344B1. In these cases, the codes that do actual business operations on the information and the codes that display, analyze and approve the result of the operation are mixed.

In today's rapidly-developing business environment, the approval and its criterion often change. For example, it is possible for an organization to have different rules to decide which purchase order needs to be approved according to different financial situations. For another example, a student's enrolling in a course is usually controlled by a system based on the capacity of the classroom, however, the professor conducting the course also can approve or reject the student's enrolling request.

Thus, in the prior art with the business operation code and the approval code mixed, it is difficult to change the approval rule and process without affecting business logic, and vice versa. That is to say, it is impossible to enable the business operation that was not designed approvable to become approvable, and it is very costly and impractical to make all the business operations approvable.

In various business systems, there exist diverse requirements of approval. Up to now, most e-commerce systems use hard codes to implement approval control. Since the approval request in an enterprise often changes with time and the situation, it is difficult to implement a flexible system to meet all approval requests. Usually some offline manual approval processing is needed in such an existing system, which may cause slow response to the customers and incomplete information in the system.

Websphere Commerce Suite (WCS) a product of IBM corporation, is a tool for building e-commerce applications.

WCS Marketplace edition (MPe) version 4.x implemented a simple approval framework for the WCS version 4.1 programming model. But the command developers have to divide the code for the execution logic into six separate methods, which include pre-approval, post-approval, pre-reject, post-reject, pre-cancel and post-cancel methods. When an action needs approval, the system will call the pre-approval method to prepare, then the approver can view the intermediate result. If the approver decides to approve, then the system will execute the post-approval method to finalize the data.

Though the above method has some capabilities that allow the developer to build approvable commands, this approach has some disadvantages caused by the division of one business operation into several method calls. There are two most significant disadvantages. First, improper method division causes system defects, among which many defects can be found in complete function and performance test, or when the system is being modified, which are not likely to happen in systems with only a small number of new commands, i.e., these defects are not easily corrected. Second, the approval logic can not be separated from business logic, without which such works as flexible development can not be conducted and the performance of the system is difficult to enhance. Of course, there are other disadvantages, such as complicated access control, dead lock, difficult to implement approval variations (multi-level, delegation, batch), etc.

The command developer using WCS commands needs to be very careful in deciding what goes into each respective method. The commands in WCS are to be extended by site developers for particular business requirements. However, dividing commands for approval make such extension more difficult and error prone.

SUMMARY OF THE INVENTION

With respect to the defects in the prior art, the object of the invention is to provide an approval control system and method being flexible, high effective, and easily to modify and supplement, which is implemented using an object-oriented shadowing object, wherein the business logic is realized as code snippets (commands), business objects, connectors, etc., original real data related to business logic and all the changed data created, updated, modified and deleted by the user in the course of approval are recorded therein, and the approval logic is implemented independently to be separated from business logic.

In order to achieve the above-mentioned object, the present invention provides an object-oriented method using shadowing object for approval control, comprising the steps of calling a business operation; determining whether the business operation needs to be approved; if the business operation needs to be approved, establishing a shadowing business object and a shadowing connector corresponding to the original business object and the original connector, performing the business operation on said shadowing business object and connector, storing all results in said shadowing business object, and buffering all messages to be sent in said connector; and if the business operation is approved, replacing said original business object by said shadowing business object.

The present invention also provides an object-oriented system using shadowing object for approval control, comprising business operation means for performing a business operation; execution management means for managing the operation of the business operation means; a determination unit connected to the execution management means, for determining whether the business operation needs to be approved; and approval management means for performing approval management, for generating a shadowing business object and a shadowing connector for the business operation corresponding to the original business object and the original connector for storing the results of the business operation if the business operation needs to be approved, and for replacing the original business object by the shadowing business object after approval, to generate approved results.

By utilizing the present invention, any business operation in the system can be approved or rejected by designated approver or approval code that analyzes the result of the operation. The system developers implementing the business operation only need to care about the implementation of the business logic without needing to consider approval logic. Approval logic can be processed separately by another group of developers, or need not to be processed at all if using the default approval utilities of the infrastructure. The code for the business logic and approval logic can be changed independently. Therefore, it can be easier to customize the business operation as code snippets, business objects and connectors, etc., and build more complicated approval logic (such as approval delegation, batch and multi-level approval). By maintaining the original business objects and modified object (shadow), the approver (or approval code) can be provided with richer information to enable him to check the original content before, in the middle of, and after the business operation. In contrast, in a conventional method, business logic often modifies the information in the original object and marks it as "to be approved". The approver thus can only see the modified information or special code duplicating original data. Therefore, from the view of application development and modification, the present invention features more capabilities and flexibility as compared with the above-mentioned prior art.

BRIEF DESCRIPTION OF THE DRAWINGS

The above object and other objects, features and advantages will become more apparent through the following description of specific embodiments in conjunction with the drawings, in which.

DESCRIPTION OF THE PREFERRED EMBODIMENT

Object-oriented design and development is currently a mainstream technique employed in building information systems. The widely used object-oriented pattern of system architecture is MVC (Model, View, Control) and Command, which have been adapted in popular programming models like J2EE, (Java 2 platform enterprise edition) San Fransisco, etc.

In these frameworks, application code can be divided into two parts: the code that implements transient logic operation (code snippet) and the code that implements persistent information storage (business object and connector). The approval framework of the system of the invention applies to this kind of object-oriented system, which will follow the following cases: the business logic is implemented in transient code (servlet, session bean) and persistent code (entity bean, data records) that will result in state changes.

The system developer builds each code snippet (such as command, controller, etc.) to operate on business objects and connectors for a specified business task. These code snippets and business objects (and connectors) need to follow a programming guide and implement some kind of interfaces, or to be derived from various kinds of generation units (base class). These code snippets and business objects are managed respectively by an execution management units and an approval management unit. The approval management unit also manages connectors to communicate with other systems.

The object-oriented system using shadowing for approval control according to the present invention will be described in detail in conjunction with FIG. 1 hereinafter.

Figure 1:
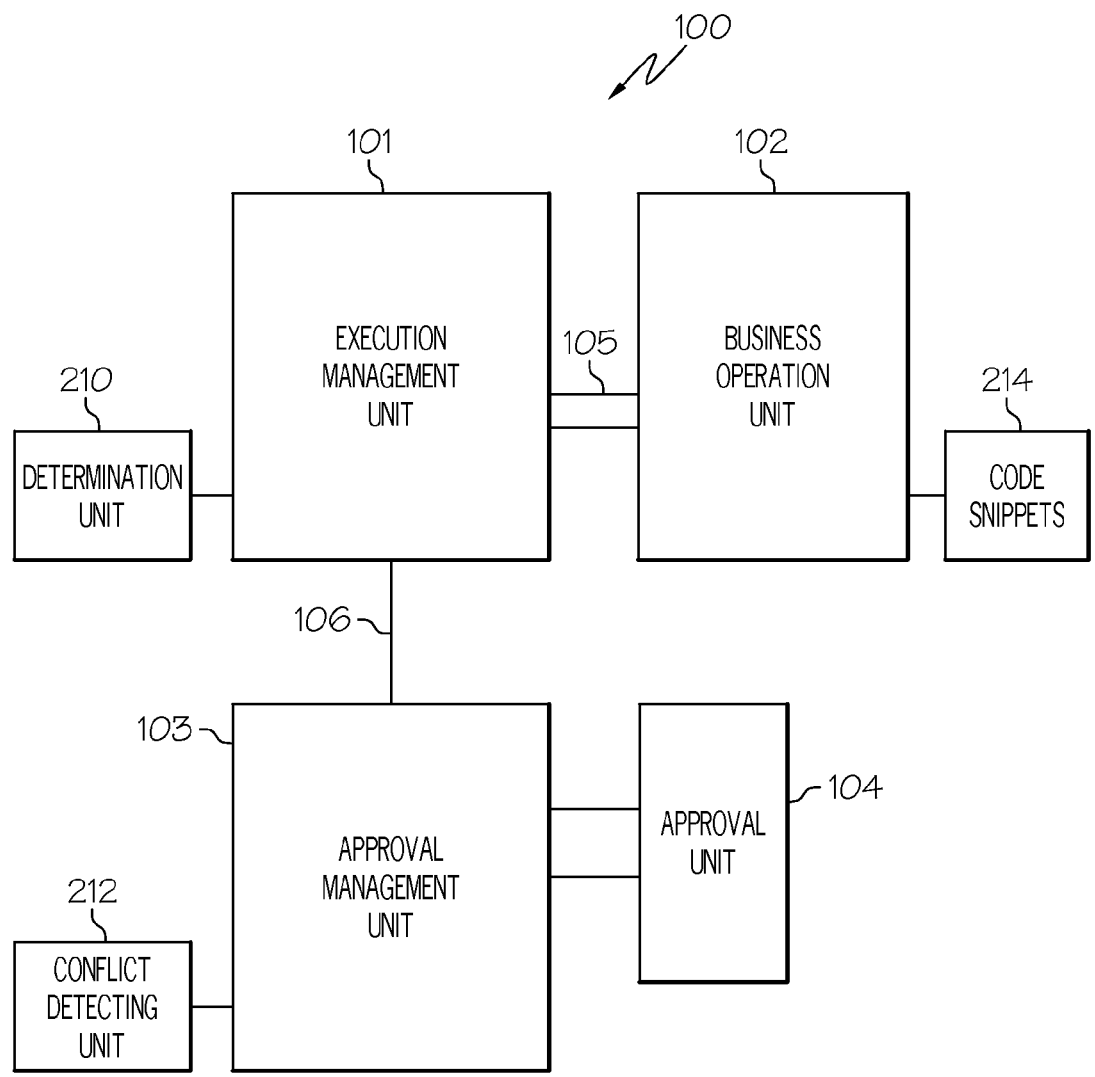
FIG. 1 is a block diagram of an embodiment of the object-oriented system using a shadowing object for approval control according to the present invention.

As shown in FIG. 1, the object-oriented system 100 using shadowing for approval control (abbreviated as "the system" hereinafter) comprises an execution management unit 101, a business operation unit 102, an approval management unit 103, an approval unit 104, an interface 105 for connecting the execution management unit 101 with the business operation unit 102, and an interface 106 for connecting the execution management unit 101 with the approval management unit 103. The interfaces 105 and 106 can be, for example, application programming interfaces (APIs). In addition, the execution management unit 101 is connected with a determination unit 210; the approval management unit 103 is connected with a conflict detecting unit 212; the business operation unit 102 is connected with code snippets 214; and the API (not shown) connecting above-mentioned units and making them interact is used to implement allowed communications and interaction between each unit in the present system 100.

The above system can be implemented in a desktop computer (such as workstation, personal computer, etc.) executing a program embodying the technique of the invention. It can also be implemented as a client end and an approval end connected through local area network, intranet or wide area network (such as the Internet).

The execution management unit 101 is a control point. It maps all the business operation into the instances of specific code snippets (commands) 214, sets execution context for all the instances of the code snippets, calls the appropriate functions of the code snippets, and manages all the code snippets. One business operation can be mapped into one or more instances of code snippets. Each instance of the code snippets needs to be registered and examined in execution management units 101 for effectiveness before being called by the user or customer application. The execution management unit 101 is also responsible for displaying usable instances of code snippets (commands) to the user for him to select or call.

The business operation unit 102 functions to permit the user to request execution of a business operation (i.e., the instance of a code snippet).

The code snippets 214 can generate the instances of the code snippets through a code snippet generation unit (not shown) according to the requirement of the execution management unit 101. The code snippet generation unit provides simplified coding function, and provides a default mechanism for interacting with the execution situation and processing the events and exceptions in this kind of structure.

The execution management unit 101 receives a request from a user for executing a business operation (executing the instance of the code snippets), calls the instance in the code snippets 214 through the business operation unit 102 via the interface 105 to cause execution in the execution management unit 101, and determines through the determination unit 210 whether the business operation needs to be approved. The execution management unit 101 is connected with the approval management unit 103 through the interface 106 to exchange commands and data.

The approval management unit 103 manages all the business objects and connectors, and all the business objects and connectors need to be registered and examined for effectiveness before being used by the instance of the code snippets.

The developer can use the execution management unit 101 to create the approval management unit 103 from configuration files. There can be only one instance of the approval management unit 103 at the approval end to coordinate and manage all the resources; there can also be a plurality of instances of the approval management unit 103, but at this time the concurrent access to resources need to be focused on specially, the function of which is accomplished by a conflict detection unit included in the approval management unit 103 (the situation that more than one session access one object at the same time will be described below). All user requests are implemented by requesting the execution management means 101 to call designated code snippets instance (command) to operate on permanent objects (business objects and connectors). The results of the operation are the changing of business data (stored as shadowing business objects) and the transmission of information (implemented through connectors).

The approval management unit 103 is connected with the execution management unit 101 through the interface 106, and receives the instructions from the execution management unit 101. If the instructions indicate that the business operation of the user is to create a new business object, then a corresponding business object and connector are created using the object and connector generation unit (not shown) and are marked as a shadowing object and a connector. Their corresponding original business object and connector are null.

The above object and connector generation unit (not shown) is the base class to generate business object and connector in the prior art. It provides the function of simplifying business object coding, and meantime provides a default mechanism of processing events and exceptions in the framework.

The above connector can buffer the message data to be transmitted. It should also be responsible for notifying the approval management unit 103 of whether the remote system (not shown) also supports this kind of approval. If so, the approval management unit 103 sets the connector to wait for approval and transmit the message without buffering the message. Thus, after the business operation is approved or rejected, the approval management unit 103 notifies the approval result to the remote system. The operation of the connector's transmitting the message can be implemented by a transmission unit (not shown), and the transmission unit can be any framework connected with the connector in the prior art.

In the case that the above business operation needs to be approved, the approval management unit 103 generates a shadowing business object corresponding to the original business object for storing all the resultant data of the user's operation.

In addition, the execution management unit 101 preferably creates a session object in the approval management unit 103 for the business operation to operate the shadowing business object and for the approval unit 104 to check. If the session object relates to a plurality of business objects and shadowing business objects, they need to be operated and checked in association. The shadowing business object can only be operated and checked by the session object instead of being checked by other irrelevant session objects. The session object has an approval setting flag which indicates the operation needs to be approved.

The approval unit 104 is connected with the approval management unit 103 to check the session object held by the approval management unit 103 and the related data stored in the shadowing business object and corresponding original business object and connector. The functions of the approval unit 104 comprises at least listing all pending sessions, listing the object stub in the pending sessions, listing all objects in the object stub, checking the objects, approving the session, and rejecting the session.

Figure 2:
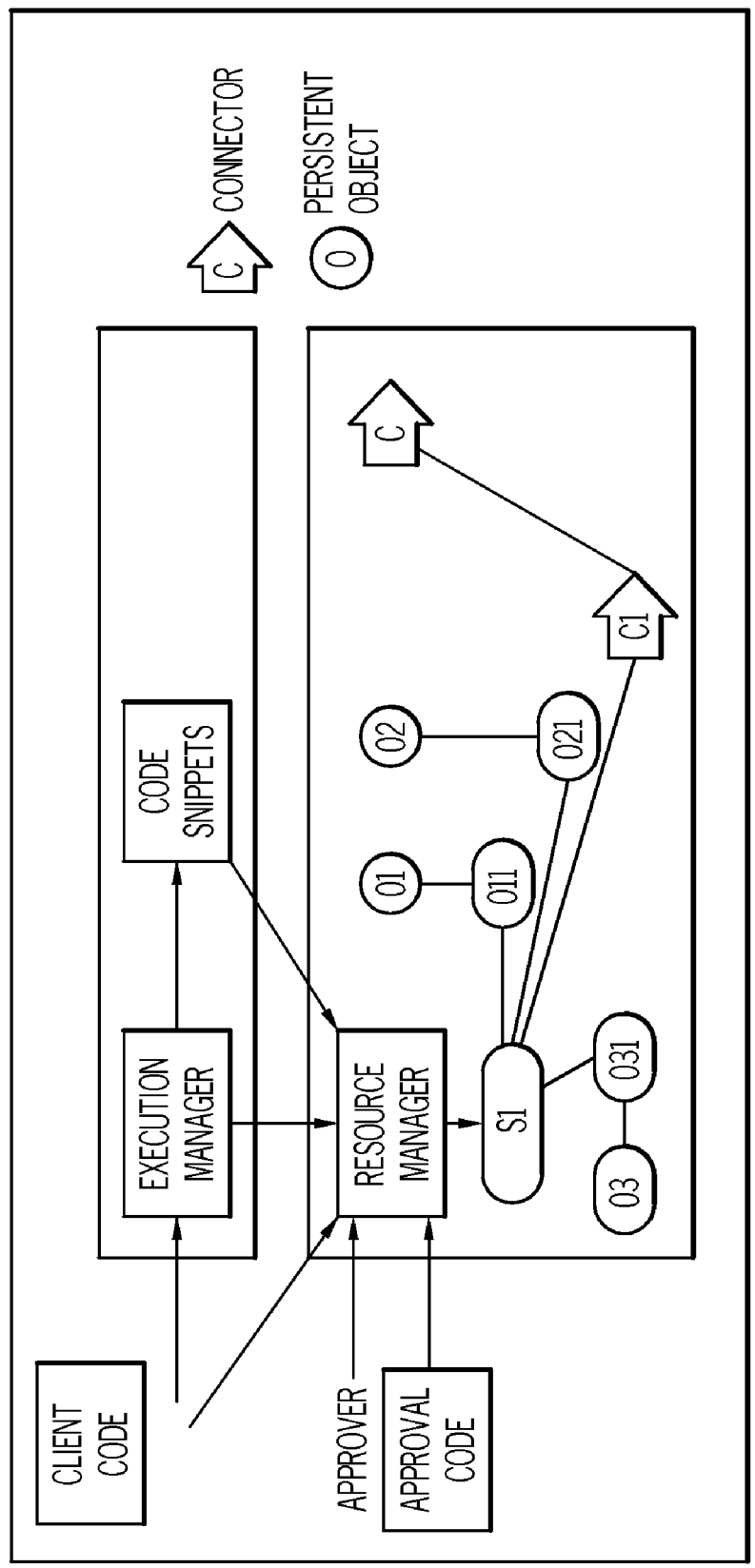
FIG. 2 is a schematic diagram describing an example of generating a shadowing object and connector according to the embodiment of the system of FIG. 1 of the present invention.

FIG. 2 shows an example of generating a shadow by the system of the present invention. As shown in FIG. 2, the execution manager therein acts as the execution management unit, and the resource manager acts as the approval management unit. A shadowing object O11 is generated for the original object O1, a shadowing object O21 is generated for the original object O2, a shadowing object O31 is generated for the original object O3, and a shadowing connector C1 is generated for the original connector C. All of these shadows are operated and managed by the session S1 in the approval management unit and communicate with each other.

Hereinafter, the operation of the object-oriented system using shadowing for approval control will be described in detail in conjunction with FIG. 3.

Figure 3:
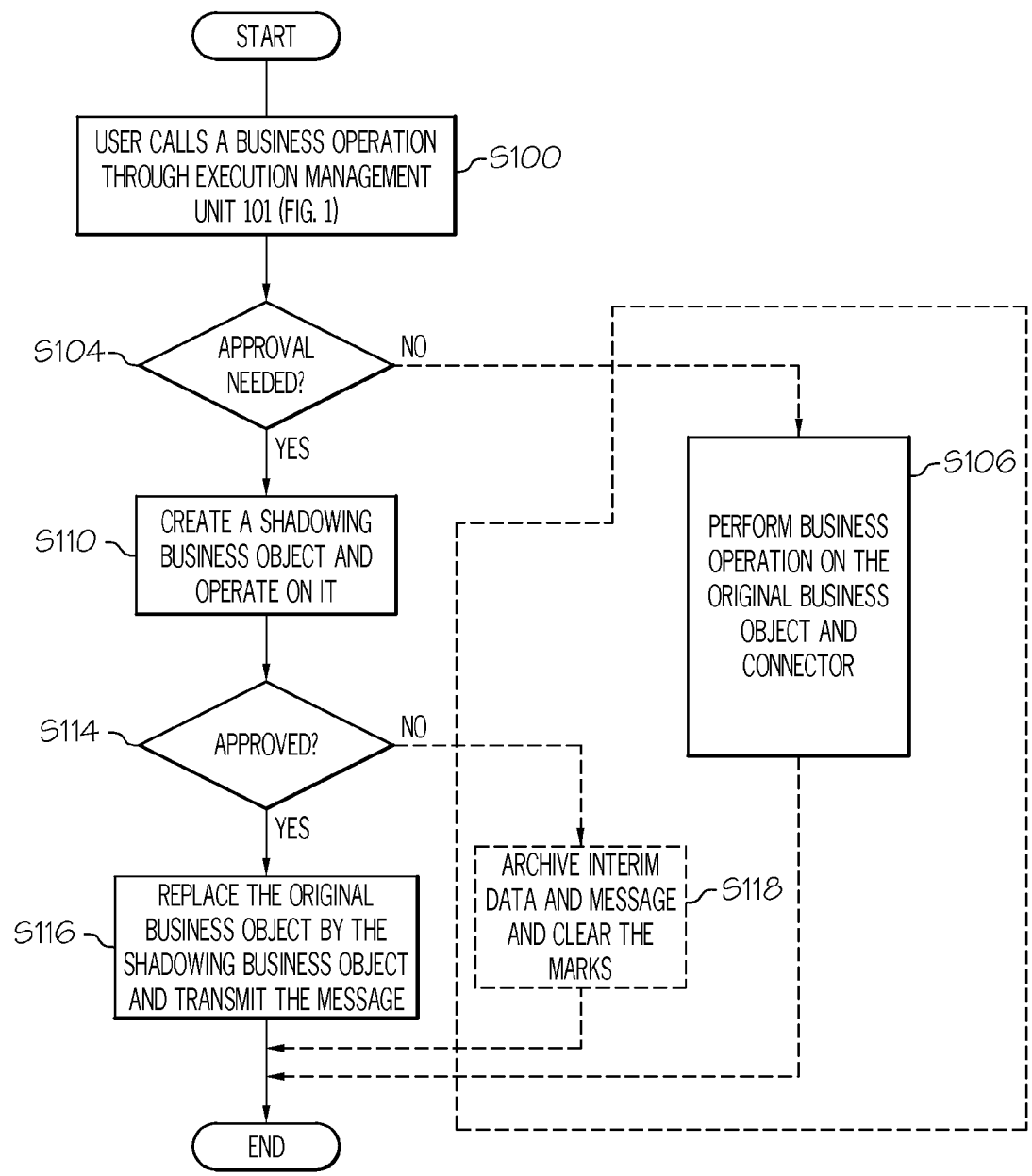
FIG. 3 is a flow chart describing the operation process in the system of FIG. 1 of the present invention.

FIG. 3 is a flow chart describing the method implemented in the system 100 of the present invention.

As shown in FIG. 3, in step S100, the user calls a business operation through the execution management unit 101 (such as the operation of depositing and withdrawing money in banking transactions), i.e., executes an instance of the appropriate code snippet (the code snippet corresponding to the operation of depositing and withdrawing money from a bank).

In step S104, the execution management unit 101 determines whether the execution of the instance of the code snippet needs to be approved (such as by examining the approval setting parameters, etc., in the access control stored in a storage (not shown)). The approval setting parameters are the criteria for the execution management unit 101 to determine whether the execution of a code snippet needs to be approved. For example, in banking transactions, approval criteria can be determined as to the amount of the money to be deposited or drawn. Approval is not needed for transactions below a certain amount of money and is needed for the transactions above a certain amount of money.

In step S110, the execution management unit 103 creates the shadow corresponding to the original business object and connector (called as "shadowing business object" herein) (i.e., the copy of the bank account and all the data therein) and marks it as "shadowing".

In the meantime, the instance executed in the execution management unit 101 obtains through the interface 106 from the approval management unit 103 the shadowing business object and the connector for communicating with an external system, and conducts corresponding operations thereon through said session object (i.e., operating on the copy of a bank account) without operating on the original business object.

These operations include creation, update, modification, deletion, etc., of all the data in the shadowing business object (these user operations will be described in detail below). All the operation results of the user are stored in the shadowing business object and all the related messages are stored in the connector.

If approval is needed, the execution management unit 101 can also create a session object in the approval management unit 103, the session object has an approval setting flag indicating that the operation needs to be approved.

Then in step S114, the approval unit (or the approval code) 104 can check all pending sessions and the related shadowing business object, original business object and various messages buffered in connectors to determine whether to approve or reject the operation.

If the operation is approved, then in step S116, the approval management unit 103 will replace the original business object with the modified shadowing business object and mark the shadowing business object as a normal business object. In the meantime, the original connector is replaced by the shadowing connector, and the messages buffered in the connector are transmitted to other systems (i.e., replacing the original bank account with the copy of the updated bank account to make the operation of depositing and drawing money to the bank account to be confirmed by the user operating unit).

If the operation is not approved, then in step S118, the approval management unit 103 archives all the interim data and messages for future reference, and deletes all marks on the marked business object. Thus, all the processes are completed.

In addition, if in step S104 it is determined that the approval is not needed, then the process proceeds to step S106, and the execution management unit 101 notifies the approval management unit 103 to provide it with the original business object and connector, the business operation unit 102 records various data of the business operation in the original business object (i.e., conducting the operation of depositing and drawing money in the originally established bank account) for future reference. Then the process is completed.

The operations of the user will be described below. The execution of the instance of the code snippets (i.e., business operation of the user) comprises using the interface provided by the approval management unit 103 to conduct such operations as creation, update and checking, modification, deletion and display on all the business objects and uses different shadowing methods for different operations.

For creation (such as establishing a new bank account), the execution management unit 101 first instructs the approval management unit 103 to create an original business object and connector and marks it as shadowing business object and connector, then the user can do other business operations.

For checking, the approval management unit 103 marks the original business object to be checked. But when other users try to modify the business object, both the user who creates the session object corresponding to the business object and the user who tries to make a modification will receive an exception notice. The developer may decide what kind of exception code is to be used under such circumstance.

For modification, the approval management unit 103 will create a shadow of the original business object, i.e., a shadowing business object, which contains all the data of the original business object and makes the modification conducted on the shadowing business object. The exception program will notify the status that the business object is being modified to the checking and modification operations conducted subsequently.

For deletion, the approval management unit 103 will create in a session a special null object corresponding to the original business object as a shadowing business object. There is no data of the original business object in the null shadowing business object. So what is seen in the current session is the deletion of the object, and the other users can see the original real business object.

For display, if the displayed result needs to be approved before allowed to be seen by users, then the displayed content will be buffered in the connector to wait for the approval and rejection of the approval unit 104. If it is approved, the displayed content will be transmitted to a display device (not shown) by the connector through suitable communication channel. If it is rejected, then the rejection information will be transmitted to the display device.

As mentioned above, when a session object tries to obtain the business object which has been modified or is being modified by the other session objects, the code snippets can be coded as the execution management unit 101 and approval management unit 103 inform the conflict situation to related session.

The conflict problem can be solved by using a lock mechanism in the interfaces of the execution management unit 101 and approval management unit 103. An example of a lock rule similar to a database lock will be described below.

When a session object needs to access a business object, a lock type can be designated in the functions new( ) and find( ) and code can be written to solve the exception case caused by the conflict generated by other session business object. The approval management unit 103 will mark the original business object and the shadowing business object according to the lock type. Thus, if other session object needs to access the same object, then the approval management unit 103 will know how to respond, for example, it can execute such operations as sending notices or throwing exception.

There could be four types of locks. These are query, query for modification, modification and deletion. Query is the default lock which does not affect other locks. Query for modification will mark the original business objects, so if other session objects try to modify or delete a business object in the query, the session with the lock of query for modification will be notified. The application code therein can either neglect this kind of exception case or process it. The locks of modification and deletion are the same as the lock of query for modification with the only difference that the approval management unit 103 needs to create a shadowing business object in the case of the locks of modification and deletion.

An instance of using a lock to solve the problem that a plurality of sessions access a business object at the same time will be described below.

```
ResourceManager rm=new ResourceManager(context)
Finished=fause;failed=fause;
While(!finished and !failed){
Try
    Order o1=rm.get(Order,orderid, update)
    O1.price=123;
    Finished=true;
    }catch(ExcludeLock e){
        flag=rm.killothers(e.lock);
        If(flag=0) failed=fause;
            Else failed=true;
    }
}
```

The pseudo code of the instance shown above tries to modify an order and use the modification lock to get the order. When another session applied "ExcludeLock" (query for modification, modification), the pseudo code will capture the exception "ExcludeLock". In the meantime, the pseudo code will inform the approval management unit 103 to check other relatively active or pending session objects. If the other session objects are in a pending status (such as waiting for approval), then the pseudo code will reject the session; if the other session objects are in an active status, the pseudo code will send the request for killing the session object to the approval management unit 103. The other session objects will receive the notice of the exception and operate according to their respective codes.

If all the other sessions have been killed, then the approval management unit 103 will return the value of flag=0, thereby releasing the lock, otherwise it will return the negative code with an error message.

In addition, in order to develop and run the approval system, the application system developer needs to follow a programming rule for implementing the infrastructure of the framework, i.e., all the business operations should be implemented by transient code snippets operating on stateful business objects and connectors connected to other systems. The code in business object and connectors should not call each other or call back to methods in the code snippets.

In the meantime, code snippets need to implement specific interfaces and be generated from a predefined generation unit, so they can be executed by the execution management unit 101 based on the user's request, and interact with execution context.

The code snippets should have code to process special exceptions, for example, the obtained object is marked as being modified, some modified objects have been changed by an approved session, etc. Though these special processes are not needed since the code snippets 214 provide default process mechanism for these cases, capable of processing more exceptions caused by the framework and other sessions will make the function of snippets more graceful.

In addition, making an operation approvable will need more processing power and storage capacity from a machine. When an operation does not need approval, the approval management unit 103 does not need to create a shadowing business object and can provide the original business object directly to the instance of the code snippet, thereby not needing more processing power and storage capacity. And when an operation needs approval, the approval management unit 103 needs to create a shadowing business object and store it, thereby needing more processing power and storage capacity.

Furthermore, in order to simplify the development, the framework of the present invention can be conducted by lock setting on the session layer according to a certain rule without the developer's coding as above. For example, the approval management unit 103 may have following rules. These include (a) if the modification request is issued by the business object owner, then all other blocking session will be killed (reject or release); and (b) if the modification request is issued by others, it will always cause FailedException. Then the developer does not need to the use killothers( ) function to solve locking problems.

The embodiment of the present invention has been described above in detail. Those skilled in the art will understand that various changes to the invention according to the spirit and guideline of the invention will fall within the scope claimed by the appended claims of the invention.

What is claimed is:

1. A computer implemented method for controlling approval of a business operation, said method comprising:
    calling, with an execution management unit of a computer system, a business operation responsive to input to said execution management unit;
    determining, with said execution management unit and approval setting parameter criteria, that the business operation requires approval;
    creating, with an approval management unit of said computer system, a shadowing business object and a shadowing connector corresponding to an original business object and an original connector, respectively, said original business object being stored in memory on said computer system;
    performing, with said execution management unit, the business operation on said shadowing business object and said shadowing connector, said original business object and said original connector being unchanged;
    storing results from the business operation in said shadowing business object, and buffering all messages to be sent in said shadowing connector; and
    replacing, using said approval management unit, said original business object stored in memory on said computer system with said shadowing business object when the results of said business operation are approved using predetermined approval criteria applied by an approval unit of said computer system.

2. The method as set forth in claim 1, wherein said replacing further comprises sending the messages buffered in said shadowing connector to another system for processing.

3. The method as set forth in claim 1, said method further comprising:
    creating a corresponding business object and a corresponding connector, and marking them as shadowing business object and shadowing connector when said called business operation includes creation of a new business object, the corresponding original business object and the original connector being null;
    wherein said shadowing business object contains all data contained in said original business object before said business operation is performed when said business operation is a modification; and
    establishing a null shadowing business object of said original business object as the shadowing business object when said business operation is a deletion, wherein said null shadowing business object contains none of the data contained in the original business object.

4. The method as set forth in claim 3, further comprising:
    establishing a session object having approval settings so that said shadowing business object, said shadowing connector and said approval management unit communicate with each other through said session object.

5. The method as set forth in claim 4, further comprising:
    reviewing pending sessions, said shadowing business object, said original business object, and said messages stored in the shadowing connector to determine either approval or rejection of said business operation.

6. The method as set forth in claim 5, further comprising:
    archiving all interim data and messages and clearing all marks on the business object when said business operation is rejected.

* * * * *